United States Patent Office 2,714,163
Patented July 26, 1955

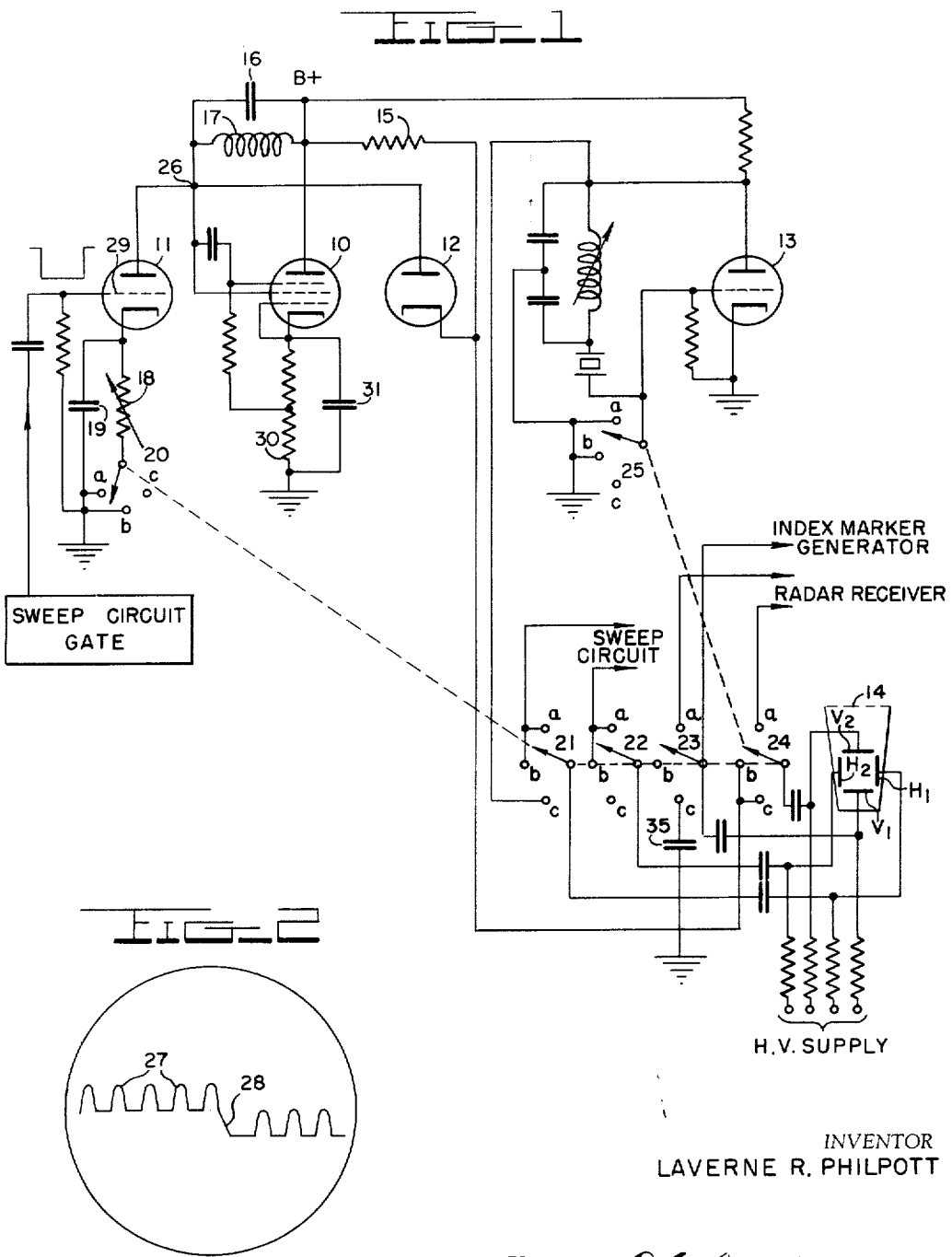

2,714,163

KEYED OSCILLATOR

La Verne R. Philpott, Caldwell, N. J., assignor to Radar Incorporated, Washington, D. C.

Original application May 25, 1944, Serial No. 537,286, now Patent No. 2,643,288, dated June 23, 1953. Divided and this application January 26, 1953, Serial No. 333,399

6 Claims. (Cl. 250—36)

(Granted under Title 35, U. S. Code (1952), sec. 266)

This invention is a division of my application Serial No. 537,286, filed May 25, 1944, and now U. S. Patent No. 2,642,288, and relates in general to a system for calibrating the sweep of a cathode ray tube indicator and more particularly to improvements in keyed timing oscillators useable for this purpose.

In cathode ray oscillography, movable index markers produced by electronically deflecting the beam of the cathode ray tube are frequently employed in making precision timing measurements. Typical of the apparatus employed to generate such index markers is a delay multivibrator containing a graduated potentiometer disposed in one of the grid legs to adjust the delay of the multivibrator and thus the timing of the index marker pulse. This or similar schemes have in the past been quite favorably used to accurately measure small intervals of time, especially in radio echo detection systems wherein the means for shifting the time phase of the index marker is graduated in range rather than time. In the use of these systems it becomes necessary, however, to provide a means for initially graduating the index marker generator as well as for checking from time to time its operating performance including reliability, accuracy and linearity. It is therefore an object of this invention to provide a keyed oscillator for producing a series of equally spaced and accurately known time markers on the time trace of a cathode ray oscilloscope.

It is another object of the present invention to provide a keyed oscillator in which oscillation is initiated immediately at an amplitude substantially as great as the sustained oscillation amplitude.

Other objects and features of the present invention will become apparent upon a careful consideration of the following detailed description when taken together with accompanying drawings, the figures of which represent a preferred embodiment of the invention.

Fig. 1 is a schematic diagram of a preferred embodiment of the invention as incorporated in the calibrating system of my application supra, and Fig. 2 is a face view of a cathode ray oscilloscope illustrating typically the relationship between a movable index marker and a series of time marker signals produced on the electron beam trace thereof by the apparatus displayed in Fig. 1.

Reference is now had more particularly to Fig. 1 wherein the keyed oscillator provided by this invention is illustrated at 10 including the oscillating tank circuit comprising inductance 17 and shunt capacitor 16. As illustrated oscillator 10 is adapted to produce a series of equally spaced time marker signals on the face of a cathode ray tube 14. The latter is shown connected so as to receive both the variable phase index marker and the marker signals from which the accuracy of the variable phase index marker generator is to be observed. As herein arranged a keying tube 11 is connected to initiate the operation of oscillator 10 synchronously with the inception of the cathode ray beam sweep. The means for producing the cathode ray tube sweep is shown in block form only since it, per se, does not form part of the present invention. Included in Fig. 1 is a crystal controlled oscillator 13 which, as hereinafter described, is adapted to provide a check on the frequency of operation of oscillator 10.

In producing marker signals I have found it advantageous to employ an oscillator 10 of the transitron variety which is capable of generating a substantially pure sine wave output. Also, by the arrangement shown, the transitron may be biased, by means of the condenser 31, resistance 30 arrangement disposed in the cathode circuit of tube 10 so as to cause this tube to draw a quiescent current equivalent to its operational current thereby removing the burden on the operational current to charge the various condensers in the circuit during the inception of oscillation. This biasing arrangement has been found to minimize the distortion in the output wave from the oscillator.

During the process of calibrating the index marker generator it is not only essential to maintain on the cathode ray tube the same relative positions of the marker signals produced by oscillator 10 but also exact and equal spacing between them. To achieve the above results, transitron 10 should be so keyed as to initiate each train of oscillations in zero phase and in such a manner as to always swing output point 26 in the same sense obtaining full amplitude during the first half cycle of output. For this reason the keying tube 11 is provided, containing a self biasing circuit comprising capacitance 19 and resistance 18 disposed in the cathode circuit thereof. The parameters of this biasing network are selected so as to normally cause tube 11 to draw an appreciable current through the inductance 17 of the transitron tank circuit. In this condition the transitron is sustained quiescent. The application of a negative gate pulse to grid 29, however, renders the keying tube 11 non-conducting and thereby stops the flow of tube 11 current through inductance 17. This action produces instantaneous inception of oscillation in oscillator 10 with point 26 always swinging positively from zero phase. In practice resistance 18 is adjusted to make the quiescent current drawn by tube 11 through inductance 17 equal to the operational current flowing through inductance 17, thereby assuring the attainment of full oscillation amplitude during the first half cycle of output from oscillator 10.

Oscillations will be sustained during the blocked period of the keying tube 11, and after tube 11 is returned to conduction the flood of current, drawn by tube 11 through inductance 17 will be restored, thus causing a rapid quenching of oscillations. The output from transitron 10 is applied through either contacts b or c of the multiple throw switch 24 to the vertical deflecting electrode $V_2$ of the cathode ray tube 14. Equal spacing between the marker signals is produced by a diode rectifier 12, connected in shunt with the tank circuit of the transitron so as to provide the vertical deflecting electrode $V_2$ with signals of only one polarity, in this case positive pulses. Thus each marker is separated from the other by a half cycle of oscillation. The action of the diode rectifier 12 may produce excessive rectified currents which tend to damp the output from the transitron 10; this may be avoided by the use of a current limiting resistance 15 connected in series with the tank circuit and the cathode of the diode 12. This resistance also serves as a load for the oscillator across which its output may be taken.

In the normal use of the oscilloscope 14, that is, when certain signals are to be timed, such as radio echo detection pulses, all of the multiple throw switches 20, 21, 22, 23, 24 and 25 which are commonly ganged are set in the a position. In this position a linear sweep derived from the sweep generator, not shown here, is applied to the horizontal deflecting plates H₁ and H₂ through switches 21 and 22 respectively, while the radar pulses derived from the radar receiver and the index marker obtained from its generator are applied to the vertical deflecting plates through switches 23 and 24. To calibrate the index marker generator the switches are adjusted to the *b* position. In this position the linear sweep is again applied to the horizontal deflecting plates H₁ and H₂ while the series of equally spaced time markers derived from the transitron 10 is applied to the vertical deflecting plate V₂ through switch 24 and the index marker whose linearity and accuracy it is desired to observe is applied to the vertical deflecting electrode V₁ through switch 23. Simultaneously with the initiation of the linear trace a negative pulse having a time length equal to the trace period and generally obtained from the sweep circuit is applied to the grid 29 of the keyer 11 thereby setting oscillator 10 into operation. In radio echo detection apparatus the time marker generator is generally graduated in range, hence, by tuning the oscillator 10 to some prearranged frequency, say 41 kc., the time marker signals derived therefrom will appear at what corresponds to 4000 yard intervals. Thus the setting of the index marker generator observed upon attaining coincidence between the index marker and a time marker signal of known range may be compared. Consequently this system provides a visible means for making certain necessary adjustments in the index marker generator to correct for deviations between the index marker setting and the actual ranges as indicated by the time marker signals. A typical illustration of the appearance of the marker signals and the index marker on the time trace of oscilloscope 14 is shown in Fig. 2 at 27 and 28 respectively. Here the index marker 28 is of the step variety which may be obtained from a circuit similar to that disclosed in my patent application entitled "Sweep Circuit Generator," Serial No. 539,373, filed June 8, 1944, now abandoned.

Since the accuracy of the calibration of the index marker circuit depends upon the accuracy of the time marker generator it becomes necessary to check from time to time the reliability of the latter. For this purpose a crystal controlled oscillator 13 is provided and tuned to operate at some harmonic frequency of the time marker generator 10, say for example twice this frequency. As the accuracy of the entire system is ultimately dependent upon the constancy of the output from the crystal oscillator 13 the crystal and certain related R. F. components may be disposed within a constant temperature oven, not shown here, so as to render the frequency output therefrom unaffected by variations in the ambient temperature.

To check the accuracy of the time marker generator 10 all of the ganged switches are set in a *c* position. In this position the linear trace is removed from the oscilloscope, while the index marker pulse is bled to ground through capacitance 35 and the keyer tube 11 is rendered blocked by virtue of the unbled capacitor 19 in the cathode circuit. In this condition both oscillators 10 and 13 will run continuously, their outputs being applied to the vertical and horizontal deflecting electrodes V₂ and H₁ respectively. Thus when the proper frequency relation between the two oscillators is attained a steady and known Lissajous figure will appear on the scope. In this case a figure having two-to-one characteristic will appear since two-to-one frequency ratio exists. Deviations from this figure indicate that oscillator 10 is off frequency and should be corrected.

Although I have shown and described only certain and specific embodiments of the present invention I am fully aware that many modifications are possible thereof, without departing from the spirit and scope of the present disclosure.

The invention described herein may be manufactured and used by or for the Government of the United States of America for governmental purposes without the payment of any royalties thereon or therefor.

What is claimed is:

1. In an oscillator circuit of the type having at least one tuned circuit, means for keying said oscillator into operation in such manner as to produce a discontinuous train of oscillation with each train maintaining a common phase relationship, comprising a normally conducting vacuum tube having at least a plate electrode and a plate supply source, said vacuum tube having the tuned circuit of said oscillator interposed between its plate and plate supply and means for periodically rendering said tube non-conducting thereby shock exciting said oscillator into operation.

2. In an oscillator circuit of the type having at least one tuned circuit, means for keying said oscillator into operation in such manner as to produce an undamped discontinuous train of oscillation with each train commencing in the same sense from zero phase, comprising a vacuum tube having at least a plate electrode and a plate supply source, said vacuum tube having the tuned circuit of said oscillator interposed between its plate electrode and plate supply, an adjustable biasing means connected to said vacuum tube to control the current passing through said tuned circuit when said oscillator is in a quiescent condition, and means for rendering said vacuum tube non-conducting thereby shock exciting said oscillator into operation.

3. In an oscillator circuit of the type having at least one tuned circuit, means for keying said oscillator into operation in such manner as to produce an undamped discontinuous train of oscillation with each train commencing in the same sense from zero phase, comprising a vacuum tube having at least a plate electrode and a plate supply source, said vacuum tube having the tuned circuit of said oscillator interposed between its plate electrode and plate supply, an adjustable self biasing circuit connected in the cathode circuit of said vacuum tube and adapted to control the current passing through said tuned circuit when said oscillator is in a quiescent condition, and means for rendering said vacuum tube non-conducting thereby shock exciting said oscillator into operation.

4. In combination, an oscillator of the electric discharge device type having an inductance capacity resonant circuit for determining the frequency thereof, and a trigger circuit connected for abruptly varying direct current flow through the resonant circuit, and an amplifier acting as a negative resistance connected to initiate oscillation of said circuit immediately at an amplitude substantially as great as the sustained oscillation amplitude.

5. In combination, an oscillator of the electric discharge device type having an inductance capacity resonant circuit for determining the frequency thereof, and a control circuit connected for abruptly varying direct current flow through the resonant circuit, and an amplifier acting as a negative resistance connected to initiate oscillation of said circuit immediately at an amplitude substantially as great as the sustained oscillation amplitude.

6. In combination, an oscillator of the electric discharge type having at least one tuned circuit for determining the frequency thereof, a normally conducting vacuum tube keyer having the tuned circuit of the oscillator in the space current path thereof, and means for abruptly varying the current flow through said vacuum tube keyer to thereby shock excite said oscillator into operation.

References Cited in the file of this patent

UNITED STATES PATENTS

| | | |
|---|---|---|
| 1,932,155 | Culver | Oct. 24, 1933 |
| 2,448,543 | Moore | Sept. 7, 1948 |
| 2,457,580 | Mayer | Dec. 28, 1948 |

UNITED STATES PATENT OFFICE
CERTIFICATE OF CORRECTION

Patent No. 2,714,163

July 26, 1955

La Verne R. Philpott

It is hereby certified that error appears in the printed specification of the above numbered patent requiring correction and that the said Letters Patent should read as corrected below.

Column 3, line 38, for "abandoned" read -- U. S. Patent No. 2,838,752--.

Signed and sealed this 28th day of October 1958.

(SEAL)
Attest:

KARL H. AXLINE
Attesting Officer

ROBERT C. WATSON
Commissioner of Patents